Oct. 15, 1935.  H. T. WHEELER  2,017,425
FRICTION TESTING MACHINE
Filed March 30, 1931   2 Sheets-Sheet 2
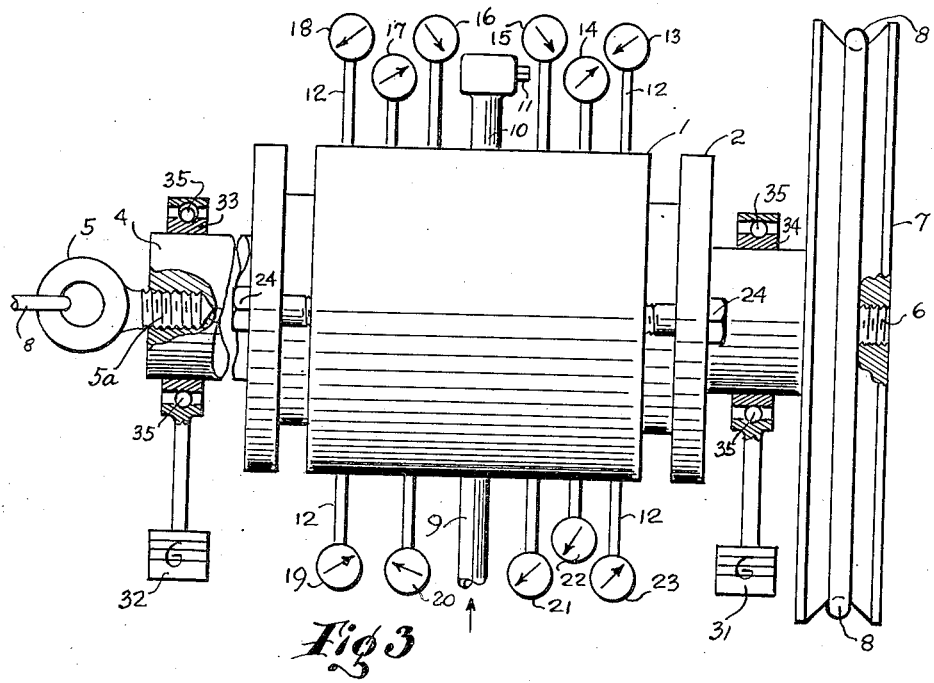
Fig 3
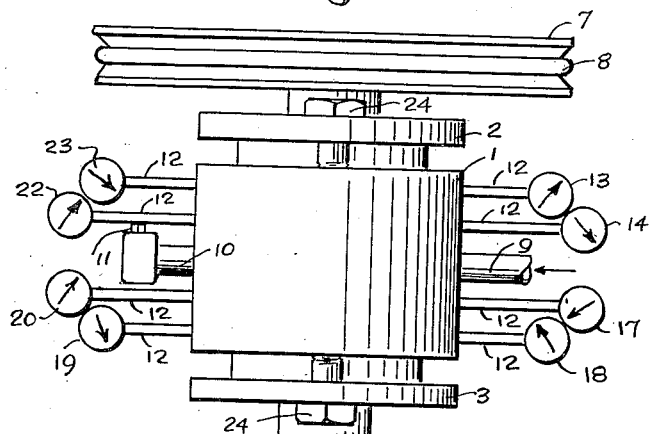
Fig 4
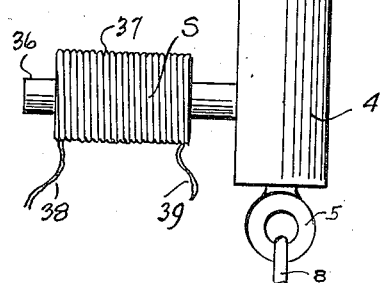
INVENTOR.
Harley T. Wheeler Patented Oct. 15, 1935

2,017,425

UNITED STATES PATENT OFFICE 2,017,425

FRICTION TESTING MACHINE

Harley T. Wheeler, Dallas, Tex.

Application March 30, 1931, Serial No. 526,287

14 Claims. (Cl. 73—51)

This invention relates to certain improvements in a device for testing packing and its chief advantage lies in a capability of determining by friction various characteristics of stuffing-box packing when subjected to pressure.

Another advantage is that but one setting of the packing is needed to ascertain the friction resulting from any direction of the shaft movement.

One other advantage is that by controlling the position of the testing machine, the effects of weight and bearing load on the friction of the packing against the rod may be secured.

Still another advantage is that the testing machine shaft may be made to vibrate at any period of time, the resulting effect on the friction of the packing against the rod being shown by the measurements taken.

Another and important object is to provide a means to determine the internal pressure of the packing, as well as pressures at surfaces adjacent to the packing, and at any desired point.

With these advantages and objects in view, further advantages of operation and construction will become evident as the details are explained, together with the accompanying drawings, wherein:

Figure 3 is an elevation of the testing machine in a horizontal position arranged to measure the effects of a bearing load.

Figure 4 is an elevation of the testing machine placed in a vertical position and arranged to measure the effects of vibration of the rod.

Figure 1:
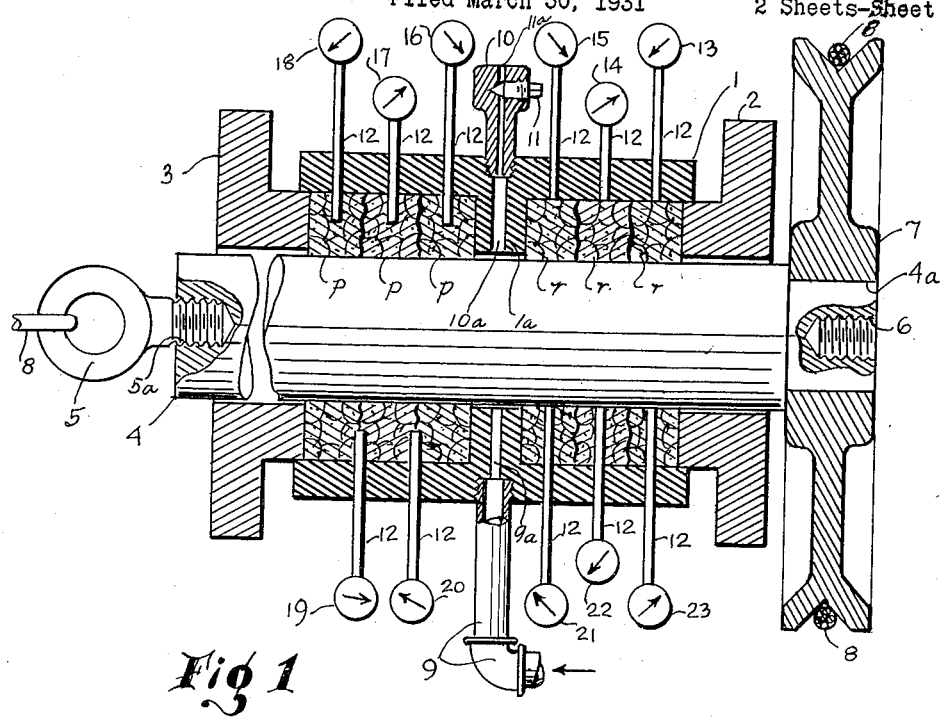
Figure 1 is a cross-section of the testing machine, on line 1—1 of Figure 2.

My testing machine is made up of a cylindrical frame 1 shaped like the ordinary stuffing box. Said frame has an inwardly extending flange 1a midway between its ends, said flange having an opening therethrough sufficiently large to receive the shaft or rod 4 loosely therein. The space within the frame and each side of the flange 1a is adapted to receive the packing rings r and p and it is obvious that the device may be made to accommodate any desired number of packing rings.

The rings are adapted to be compressed within the frame 1 by means of glands 2 and 3, one at each end of the frame. Said glands are adapted to be adjusted against the packing by bolts 24 in the usual manner.

At one end of the shaft 4 the diameter of the shaft is reduced and formed into polygonal shape to receive the pulley 7. Said pulley is shaped to fit said shaft and has on its outer surface a rope or cable 8 secured within the outer groove of the pulley at some point as indicated at 25 in Fig. 2. It is to be understood that this rope may be secured in different positions upon the pulley and may be wound in different directions about the pulley as may be required in making tests. When this is done it will be observed that further openings through the pulley, not here shown, will be required.

In order to determine the force necessary to rotate the shaft 4, I have shown the end of the rope 8 secured to the end of a draw bar 30, which forms part of a measuring device similar to the ordinary spring scale. The draw bar is projected into a frame and has a pointer 27 thereon which is held resiliently against movement to the left in said figure by means of a spring 30a. Said pointer moves along a scale 28, which is graduated to indicate the number of pounds pulled upon the scale. The indicator may be secured at its opposite end to a rod or cable 29 by means of which a pull may be exerted upon the rope 8.

At each end of the shaft 4 I have shown threaded sockets 5a and 6 adapted to receive an eye bolt 5 through which a pull may be exerted upon the shaft to cause a longitudinal translation of said shaft in the packing.

I contemplate forcing fluid under pressure into the interior of the box. This is done through the pipe 9 connected with the wall of the box intermediate its ends and having a passage 9a leading inwardly through the flange 1a to a point closely adjacent the rod. On the opposite side of the box the passage 10a leads from the interior outwardly and connects with a small nipple 10 having a fluid conducting passage therethrough. A needle valve 11 in said passage serves to regulate the rate of flow of the pressure fluid therefrom. Beyond the valve the passage 11a is extended outwardly to the atmosphere.

I measure the fluid pressure within the packing and about the shaft by means of gauges 13, 14, 15, 16, 17, 18, 19, 20, 21, 22 and 23. As may be noted, these gauges are connected by pipes 12 to various points within the frame of the machine. Those pipes 12 which are connected with gauges 13 to 15, inclusive, are extended through the wall of the box to the outer surface of the packing rings r and will serve to indicate the fluid pressure along that surface. The pipes which are connected with the gauges 16, 17 and 18 are extended through the wall of the box to a point about centrally of the cross-sectional area of each of the three rings p. The gauges 19 and 20 are on the other hand extended to a point between the adjacent rings. The gauges 21, 22 and 23 register the pressure adjacent the rod or shaft and indicate the pressure of the film existing on the rod surface in the middle of each of the packing rings. The machine described up to this point will indicate the friction due to the pressure impressed on the packing, plus whatever effect is caused by the weight of the moving parts, to wit, the shaft 4, the eyebolt 5 and the pulley 7. As the latter three parts are slight in weight in proportion to the effect of the applied pressure thru the piping 9, investigation of weight or bearing thrust against the packing is made possible by the addition of the weights G, G placed on the standards 31 and 32. The downward pull of the weights G, G is transferred thru the bearing balls 35, 35 to the collars 33, and 34 of the shaft. The ball bearing suspension eliminates any tortional effect on the shaft 4 during rotation and maintains the weight in one position, the vertical.

Inasmuch as a bearing thrust is a dead weight in a given direction, it is desirable in some cases to investigate the friction of packing devoid of all side thrusts. In Figure 4 is shown the testing machine with the rod 4 in a vertical position for this purpose. The friction of the packing against the rod 4 will hold the latter in any position and its weight is so slight in comparison to the friction that no thrust taking surfaces are needed to locate the shaft in an endwise direction.

The matter of vibration, of high or low pitch, is a bearing load of short duration of time. In Figure 4 is shown an arrangement for producing vibration in the rod 4 by a convenient means. The assembly S is a solenoid composed of a coil of wire 37 with an iron core 36, which may be made to vibrate against the rod 4 by connecting the terminals 38 and 39 to a source of intermittent current. Arrangements are made at the source of current to vary the period of current reversals and the position of the assembly S with respect to the rod 4 varies the intensity of thrust.

The operation of testing packing with this machine is to insert the samples in the two stuffing-boxes and bring them to adjustment by the cap screws 24, 24. The pipes 12 are then inserted thru the openings in the main frame 1 and positioned in the various manners indicated in Figure 1, and as the particular test may demand. Pressure is admitted thru the pipe assembly 9 and is confined to the machine by closing the needle valve 11 in the valve body 10. The pressure indicated by the gauges 13 to 23 inclusive are indicated with the shaft in a condition of motion or of rest. To secure the friction of movement, a pull is made on the rope 29 of Figure 2. The spring 30a is compressed and the pointer 27 will indicate on the scale 28, a certain pull as the pulley 7 begins to move. The shaft 4 and pulley 7 may be rotated at any rate of speed, stopped, started or oscillated by different windings of the rope upon said pulley. The particular movement of the shaft, and the pull indicated by the spring scale 28, together with the pressures indicated by the gauges 13 to 23 inclusive will provide sufficient information to determine the characteristics of the packing.

The present invention relates to a machine for taking reactions of porous or elastic bodies under confinement and subjected to fluid pressure, and is one of a group of separate inventions which may be practiced and which are disclosed in my copending applications:

Serial No. 526,288, filed March 30, 1931, which relates to a method of determining the drop of pressure which occurs in a porous or elastic body under confinement and subjected to fluid pressure and the friction which is caused by the thrust due to the drop in pressure.

Serial No. 533,430, filed April 28, 1931, which relates to the method of determining the internal flow of a pressure fluid confined within a porous structure which causes the increase or decrease of friction by a variation of the volume of porous structure due to a change in the pressure impressed.

Serial No. 537,658, filed May 15, 1931, which relates to the method of determining the rate of internal flow of a pressure fluid confined within a porous structure which causes the increase or decrease of friction by a corresponding variation of the volume of the porous structure due to the impressing and releasing of pressure.

Serial No. 578,715, filed December 3, 1931, which relates to a method of determining the comparative stress of pressure and strain of friction in porous or elastic bodies caused by pressure fluid.

To determine the effect of a dead weight against packing, or to use packing as a bearing, the arrangement shown in Figure 3 will indicate the change in pressure when the packing reacts against the downward thrust of the weights G, G. The pressures indicated by the gauges 19 to 23 will rise, while those indicated by the gauges 13 to 18 inclusive will fall. The pull indicated by the scale 28, of Figure 2, may or may not show a difference with the addition of the weights G, G. If sufficient weights G, G are added the packing rings will be deformed and pressure will finally escape along the top of rod 4. The foregoing conditions and similar changes in physical properties of the packing, when referred to the amount of the weights G, G, the speed of rotation of the shaft 4 and the pull shown by the scale 28, are the determining factors of the characteristics of the packing, as it is tested.

Figure 2:
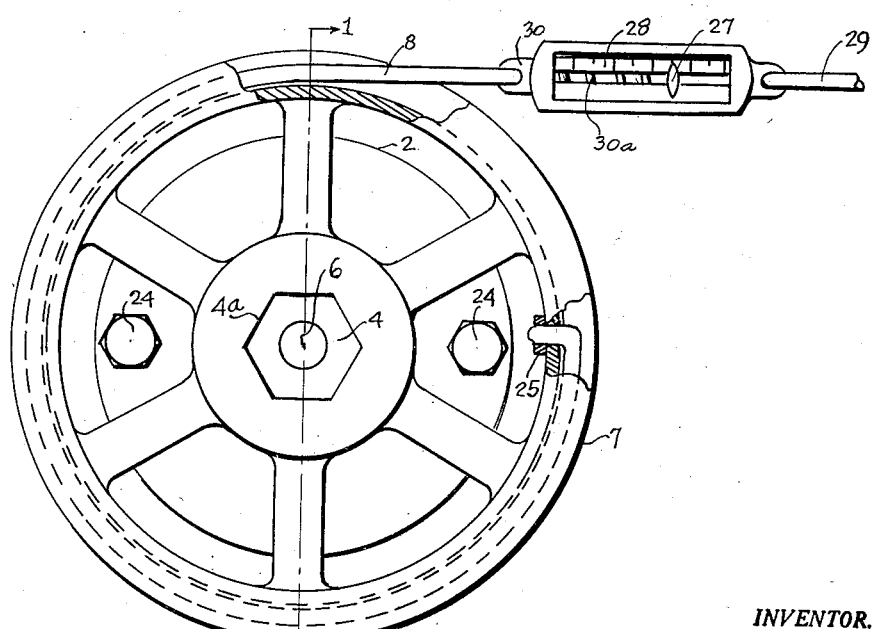
Figure 2 is an end view of the testing machine and the arrangements for measuring the friction pull.

In testing packing for reaction to vibration, it is desirable to eliminate all dead weight thrust, so as in Figure 4, the rod 4 is placed in a vertical position. The pull for rotation is secured by the rope 8 and indicated in amount from the readings of pointer 27 on the scale 28, as shown in Figure 2. The solenoid S is actuated by an intermittent electric current to a desired pitch and the position of the same solenoid S with respect to the rod 4 determines the thrust of the plunger 36. The pressures of the gauges 13 to 23 inclusive, together with the pull registered on the scale 28, as referred to motion and rate of movement of the shaft 4, are determining factors of the packing characteristics under the existing physical conditions.

While the foregoing methods of testing packing have been chiefly described as a means for determining the characteristics of rotation at different rates of speed, it should be evident that oscillation and translation or any combinations of movements by the shaft 4 will give internal pressure readings and amounts of pull, in character. It should also be evident that when any of the usual movements of rods, rotation, oscillation or translation, are complicated by vibration, sudden or dead weight thrusts, sudden stopping and starting, temperature rise and fall, the change from liquids to gases against the packings, the introduction of grit and foreign elements into the packing, and the like, that this testing machine will accurately record the internal pressures and the friction reactions in character with the changes of physical properties and the accompanying conditions.

In the operation of my device the packing which is to be tested is inserted in position within the stuffing box at each end of the frame and it is to be understood that the size of the box or the size of the shaft may be varied to accommodate different sizes and widths of packing rings; also, the shape of the rings may be varied. When these rings have been clamped in position as previously noted, the test pipes are inserted through the wall of the box so as to be positioned in the packing approximately as shown in Fig. 1. When thus positioned, tests may be made as to the friction upon the shaft which is exerted against rotation or translation thereof in the manner which has been described. The effect of pressure upon the packing may then be noted by turning fluid under pressure into the pipe 9 and thus through the passage 9a to the interior of the box adjacent the shaft. This pressure may be relieved as desired through the outlets 10a and 11a. When the pressures obtained have been noted on the indicators, tests may again be made as to the friction on the rod which tends to resist either rotation or translation of the rod. It will be obvious that the pressure may be changed and the amount of friction resulting from the pressure changes may be noted.

When this data has been compiled calculations may be made therefrom as to the effect upon the particular packing being tested of the pressure due to the direct force of the pressure fluid and also due to saturation of the packing by the fluid causing its expansion. It will thus be seen that my testing machine may be employed to obtain very necessary information in the correct composition and form of packing rings which are to be used.

It should also be apparent that this invention is adaptable to indicate the results of any conceivable condition or duty to which packing may be subjected, and that the device may be used for many other and similar determinations. While the measuring instruments have been described as simple gauges and spring balances, the more modern recording gauges may be substituted when much work is to be done. Such applications of this device as are based on the idea involved, which I do claim in the following manner:

What is claimed is,

1. A testing machine having a frame within which are formed two stuffing boxes, a partition separating said boxes, said boxes being alike as to dimensions and concentric on a common center line and adapted for the insertion of rod packing samples, adjustable packing glands in each of said stuffing boxes, a movable rod positioned on said centerline and extending through the aforesaid assembly, a pulley fixed to one end of said rod, a flexible member having one end attached to the periphery of said pulley, an instrument for measuring the force necessary to rotate said rod to which the other end of said member is fixed, and means to impress pressure against said packing samples.

2. A testing machine having a frame within which are formed two stuffing boxes, a partition separating said boxes, said boxes being alike as to dimensions and concentric on a common center line separating said boxes and adapted for the insertion of rod packing samples, packing glands in each of said stuffing boxes, a movable rod positioned on said centerline and extending through the aforesaid assembly, a flexible member attached to one end of said rod coincident with said center line, an instrument for measuring the force necessary to translate said rod, to which the other end of said member is fixed, and means to impress pressure against said packing samples.

3. A testing machine having a frame within which are formed two stuffing boxes with packing glands and a movable rod extending through the glands and a movable rod extending through the aforesaid assembly substantially as described, said stuffing boxes being adapted to receive rod packing samples, means to impress fluid pressure against said packing, means to place a weight upon said shaft, means to measure the force necessary to move said rod, said frame having an opening providing a passage into said packing, a tube having one end open, a pressure indicating gauge to which the other end of said tube is fixed, the open end of said tube being inserted into said packing through said passage, said gauge indicating the internal pressure existing at the location of the open end of said tube.

4. A testing machine having a frame within which are formed two stuffing boxes with packing glands, a movable rod extending through the aforesaid assembly substantially as described, said stuffing boxes adapted to receive rod packing samples, means to supply fluid to said boxes under regulated pressure, and means to impress pressure against said packing, means to measure the force necessary to move said rod, said frame having a plurality of openings, a plurality of tubes each having one open end, pressure indicating gauges affixed to the other end of said tubes, the open ends of said tubes being inserted through said passages into various portions of said packings, said gauges indicating the internal pressures existing at the location of the open ends of said tubes.

5. A testing machine having a frame within which are formed two stuffing-boxes with packing glands and a movable rod extending thru the aforesaid assembly substantially as described, said stuffing-boxes adapted to receive rod packing samples and means to impress pressure against said packing, weights attached to said rod to thereby produce a downward thrust against said packing, means to measure the force necessary to move said rod, and means to indicate the internal pressures within said packing samples.

6. A testing machine having a frame within which are formed two stuffing-boxes with packing glands and a movable rod extending thru the aforesaid assembly substantially as described, said stuffing-boxes adapted to receive rod packing structures and means to impress pressure against said structures, a vibrating solenoid plunger in contact with said rod to thereby induce vibration in said structure, means to measure the force necessary to move said rod and means to indicate the internal pressures within said packing structures.

7. A testing machine including a plurality of aligned stuffing boxes to receive packing therein, a rod axially of said boxes, means to measure the force necessary to move said rod in said packing, means to supply a fluid to said boxes under regulated pressure, means to indicate internal pressures transmitted to various points in said box, and means to exert pressure on said packing, whereby the force required to move said rod with and without impressed pressure may be noted.

8. In a testing machine, a cylindrical box adapted to receive packing rings, a rod axially of said box, means to measure the friction of said packing on said shaft, means to supply fluid to said box under regulated pressure, and means to indicate fluid pressures transmitted to various points in said box and along said rod.

9. A testing device for packing including a cylindrical casing adapted to contain the packing, an inwardly extending annular partition therein, a gland at each end of said casing adapted to compress the packing against said partition, means to tighten said glands in said casing, a shaft extending through said casing, means to introduce pressure fluid into said casing, means to rotate said shaft, and a plurality of devices to indicate fluid pressures at various points within said casing.

10. A testing device including a cylindrical casing adapted to contain packing, glands fitting within the ends of said casing, means to tighten said glands against packing in said casing, a shaft disposed longitudinally of said casing, means whereby said shaft may be given a relative movement in said casing, means to transmit fluid pressure into said casing and means to indicate fluid pressure at various points in said packing.

11. A testing device including a cylindrical casing adapted to contain packing and having a stationary annular partition therein, a shaft disposed longitudinally of said casing, means whereby said shaft may be moved, means to compress the packing in said casing about said shaft, means to conduct pressure fluid to said casing, means to transmit a lateral thrust to said shaft, and means to indicate the fluid pressure in said casing adjacent said shaft, on opposed sides thereof.

12. A testing device for porous packing comprising a cylindrical casing adapted to contain packing, a shaft disposed longitudinally thereof, means whereby said shaft may be moved, means to compress the packing about said shaft, means to exert fluid pressure in said casing, means to vibrate said shaft, and means to indicate fluid pressure at desired points within said box.

13. A testing device for porous packing comprising a cylindrical casing adapted to contain packing, a shaft disposed longitudinally thereof, means whereby said shaft may be moved, means to compress the packing about said shaft, a pressure fluid conducting line extending transversely to said casing, and means to indicate fluid pressures at desired points within said box.

14. A testing device for porous packing including a casing, a shaft therein, a packing to be tested disposed in said casing and around said shaft, means to introduce fluid under pressure into said casing to flow into the porous packing, means to measure the pressures at a plurality of spaced points along the casing, and means to measure the torque on said shaft.

HARLEY T. WHEELER.